(12) United States Patent
Yu et al.

(10) Patent No.: US 11,374,731 B2
(45) Date of Patent: Jun. 28, 2022

(54) FAST INITIAL PHASE SEARCH FOR DIGITAL CLOCK AND DATA RECOVERY AND RELATED SYSTEMS, DEVICES, AND METHODS

(71) Applicant: Microchip Technology Incorporated, Chandler, AZ (US)

(72) Inventors: Jiachi Yu, Guangdong (CN); Dixon Chen, Guangdong (CN); Kevin Yang, Guangdong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/445,811

(22) Filed: Aug. 24, 2021

(65) Prior Publication Data

US 2021/0385061 A1 Dec. 9, 2021

Related U.S. Application Data

(62) Division of application No. 16/588,621, filed on Sep. 30, 2019, now Pat. No. 11,101,973.

(30) Foreign Application Priority Data

Aug. 23, 2019 (CN) .......................... 201910784610.8

(51) Int. Cl.
*H04L 7/02* (2006.01)
*H04L 7/00* (2006.01)

(52) U.S. Cl.
CPC .............. *H04L 7/02* (2013.01); *H04L 7/0008* (2013.01)

(58) Field of Classification Search
CPC ................................ H04L 7/02; H04L 7/0008
USPC ......................................................... 375/371
See application file for complete search history.

(56) References Cited

U.S. PATENT DOCUMENTS

| 4,189,622 | A | 2/1980 | Foshee |
| 6,278,755 | B1 | 8/2001 | Baba et al. |
| 8,396,105 | B2 | 3/2013 | Gerfers et al. |
| 2003/0223522 | A1 | 12/2003 | Fukushima |
| 2004/0165679 | A1 | 8/2004 | Kwak |
| 2004/0202266 | A1 | 10/2004 | Gregorius et al. |

(Continued)

OTHER PUBLICATIONS

International Search Report from International Application No. PCT/US2020/070346, dated Nov. 10, 2020, 5 pages.

(Continued)

*Primary Examiner* — Kevin M Burd
(74) *Attorney, Agent, or Firm* — TraskBritt

(57) ABSTRACT

Systems, devices, and methods related to selecting a sample phase of a signal are disclosed. A method includes sampling a signal including a plurality of symbols with a plurality of different sample phases to obtain sample values of each of the plurality of symbols at each of the plurality of different sample phases. The signal is received from a shared transmission medium. The method also includes determining an edge sample phase of the plurality of different sample phases that corresponds to edges of the symbols based on the sample values. The method further includes determining a center sample phase of the plurality of different sample phases based on the determined edge sample phase, and using the determined center sample phase to determine values of the symbols.

4 Claims, 11 Drawing Sheets

(56) References Cited

U.S. PATENT DOCUMENTS

| | | | |
|---|---|---|---|
| 2006/0120496 A1* | 6/2006 | Okamura | H03L 7/0805 |
| | | | 375/355 |
| 2009/0213973 A1* | 8/2009 | Yanagidate | H04L 7/0331 |
| | | | 375/371 |
| 2020/0028662 A1 | 1/2020 | Brown et al. | |

OTHER PUBLICATIONS

International Written Opinion from International Application No. PCT/US2020/070346, dated Nov. 10, 2020, 7 pages.

* cited by examiner

FAST INITIAL PHASE SEARCH FOR DIGITAL CLOCK AND DATA RECOVERY AND RELATED SYSTEMS, DEVICES, AND METHODS

PRIORITY CLAIM

This application is a divisional of U.S. patent application Ser. No. 16/588,621, filed Sep. 30, 2019, now U.S. Pat. No. 11,101,973, issued Aug. 24, 2021, which claims the benefit of the filing date of Chinese Patent Application Serial No. 201910784610.8, filed Aug. 23, 2019, for "FAST INITIAL PHASE SEARCH FOR DIGITAL CLOCK AND DATA RECOVERY AND RELATED SYSTEMS, DEVICES, AND METHODS," the disclosure of each of which is hereby incorporated herein in its entirety by this reference.

TECHNICAL FIELD

The present disclosure relates, generally, to set an initial phase for Digital Clock and Data Recovery (DCDR), and more specifically to DCDR of signals received through shared transmission media of wired local area networks.

BACKGROUND

In data communications it is useful to identify an appropriate sample phase for a signal. A sample phase near the center of a symbol is typically the best sample phase. As a sample phase approaches transitions between symbols (e.g., edges), errors may be more likely to occur, especially in environments that are prone to noise and interference. The automotive environment is one such environment that may be prone to noise and interference. To complicate matters, received packets may come from a number of different transmitters, the symbols of which may not be aligned with each other in time. As a result, it may be needed to find a suitable sampling phase for each of the different received packets.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
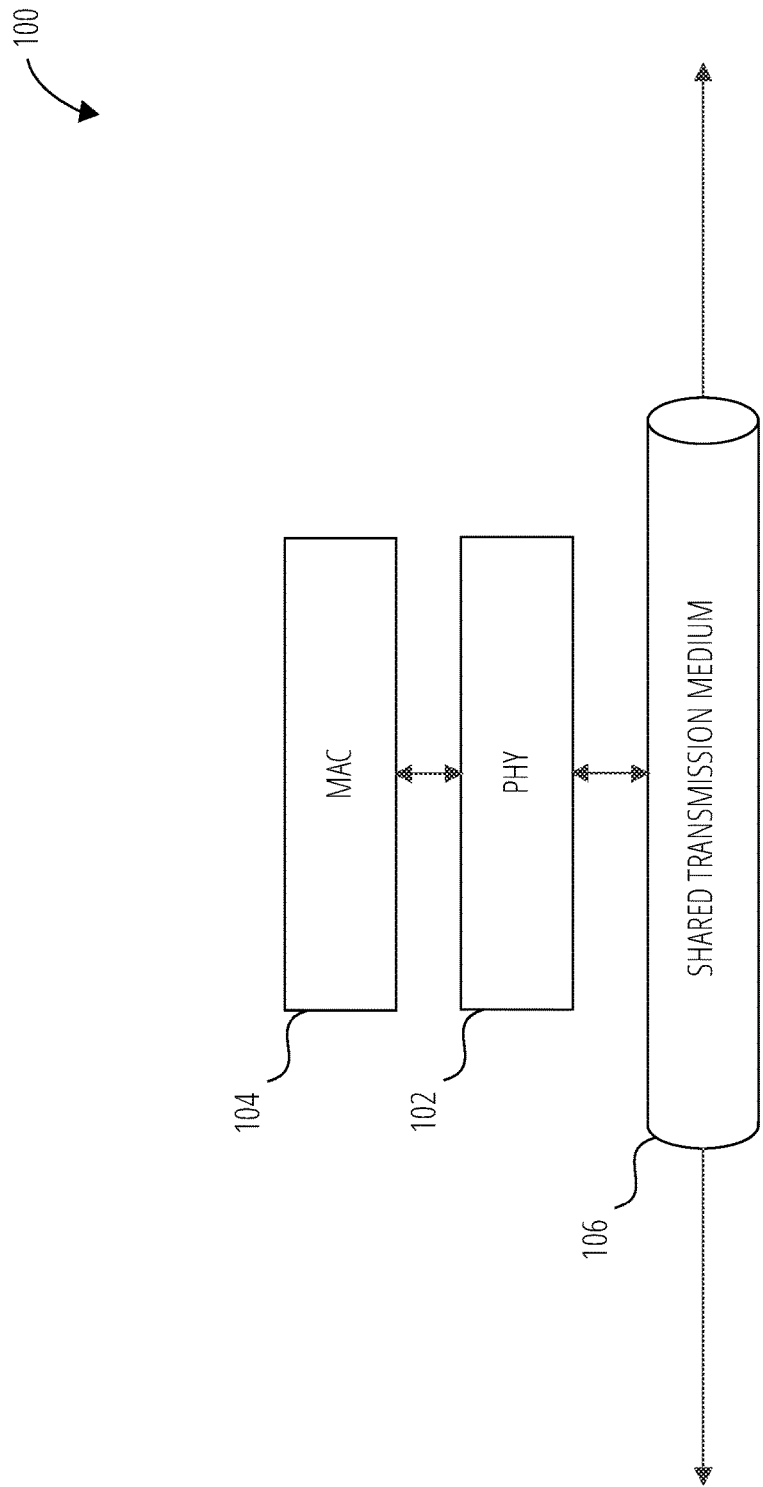
FIG. 1 is a block diagram of a portion of a network segment, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) is a network technology specification currently under development by the Institute of Electrical and Electronics Engineers as specification IEEE 802.3Cg™. 10SPE may be used to provide a collision free, deterministic transmission on a multi-drop network. The IEEE802.3cg™ is defining 10BASE-T1S (also known as "cg") for use with automotive sensors, audio, other devices, or combinations thereof. The 10BASE-T1S may also be used in backplanes and Internet of Things (IoT) networks. The cg specification targets a 10 megabits per second (Mbps) multi-drop bus that uses Carrier Sense Multiple Access (CSMA) with Physical Layer Collision Avoidance (PLCA).

In certain environments in which wired local area networks (e.g., Ethernet) are used it may be desirable to quickly identify an appropriate sampling phase for a signal. For Digital Clock and Data Recovery (CDR) (DCDR) based on multi-sampling, a relatively large amount of training data is typically needed to determine an acceptable sampling phase (e.g., the best sampling phase). Conventionally, CDR for point-to-point links uses different encoding schemes and relies on an extended Digital Signal Processing (DSP) training period prior to linkup. The 10SPE frame structure, however, includes a frame preamble that is prefixed by a SYNC pattern, the SYNC pattern including only ten symbols (e.g., in Differential Manchester Encoding (DME) code, with one symbol being about 40 nanoseconds). As a result, the 10SPE frame preamble does not have enough data for conventional CDR training to find the best sampling phase. To complicate matters further, 10SPE includes stringent tests (e.g., Bulk Current Injection (BCI) and Direct Power Injection (DPI) tests) intended to create common mode interference (e.g., high common mode creation events), and which Ethernet devices may be required to pass. Due to the shortness of the 10SPE frame preamble, it is desirable to find out the best sampling phase within several symbols (e.g., less than or equal to ten symbols).

Embodiments disclosed herein enable fast (e.g., within ten symbols or less) and reliable CDR in conditions that are relatively noisy and have a relatively high level of interference, making embodiments disclosed herein suitable for the 10SPE T1S for automotive environments. For example, embodiments disclosed herein are directed to a DCDR based on multi-sampling involved in 10SPE for improved jitter/interference tolerance. Also, embodiments disclosed herein enable recovery of data from a signal and a clock in a few bits/symbols. As a result, embodiments disclosed herein enable robust and reliable CDR in a very noisy environment (e.g., the automotive environment), passing of stringent BCI and DPI automotive tests, and determining the best sampling phase within about ten symbols or less (e.g., within eight symbols, six symbols, or even within 3 or four symbols) to enable the DCDR to work correctly and recover the full 10SPE frame. Two different solutions are disclosed herein to replace conventional training stages to find the best sampling phase within a few symbols.

Embodiments disclosed herein use quadrature clocks to oversample received signals. The oversampling is used by the DCDR to identify the boundaries of bits (e.g., symbols). In order to find the best initial phase for DCDR within a few symbols, a phase search block is introduced to replace a training stage used in conventional systems. The phase search block counts the number of edges of each sampling phase, and selects the phase with the maximum edges as the initial phase. With this circuit, the DCDR initial phase can be set within ten symbols (e.g., bit times) or less. This enables the DCDR to lock by the start of a preamble (e.g., using the bits of the SYNC pattern before the preamble—there are two SYNCs in the 10 SPE frame, and it is helpful to obtain a lock within the first SYNC because the second SYNC is used to determine a 5B boundary for 4B5B decoding), enabling the DCDR to decode the complete frame. This is useful because the preamble time is used for synchronizing the multiplicative descrambler and may be used in the future for the Operation Administration Management (OAM) field.

FIG. 1 is a functional block diagram of a network segment 100 including a link layer device, MAC shared transmission medium 106, and a physical layer (PHY) device, PHY 102, according to some embodiments. As non-limiting examples, network segment 100 may be a segment of a multi-drop network, a segment of a multi-drop sub-network, a segment of a mixed media network, or a combination thereof or sub combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation) system, elevator system or sub-system, public transit control system (e.g., for above ground train, below ground train, trolley, or bus, without limitation), an automobile system or automobile sub-system, or an industrial control system, without limitation.

PHY 102 may be configured to interface with MAC 104. As non-limiting examples, PHY 102 and/or MAC 104 may be chip packages including memory and/or logic configured for carrying out all or portions of embodiments described herein. As non-limiting examples, PHY 102 and MAC 104, respectively, may be implemented as separate chip packages or circuitry (e.g., integrated circuits) in a single chip package (e.g., a system-in-a-package (SIP)).

PHY 102 also interfaces with a shared transmission medium 106, a physical medium that is a communication path for nodes that are part of network segment 100 or a network of which network segment 100 is a part, including nodes that include PHY 102 and MAC 104. As a non-limiting example, shared transmission medium 106 may be a single twisted pair (e.g., an unshielded twisted pair or UTP) such as used for single pair Ethernet.

The network segment 100 may be used in an automotive environment in some embodiments. By way of non-limiting example, the network segment 100 may be configured to connect one or more sensors in a vehicle to a computer or controller. Also by way of non-limiting example, PHY 102 may be used in 10BASE-T1S endpoints and switches.

Differential Manchester Encoding (DME) is used to encode clock and data. PHY 102 may sometimes serve as a receiver of one or more such encoded signals, which may be received through shared transmission medium 106. The clock and data of the received signal is decoded. In 10SPE systems, no time or pattern may be provided for training to enable CDR. Accordingly, the PHY 102 needs to be configured to quickly identify an appropriate sample phase.

Figure 2:
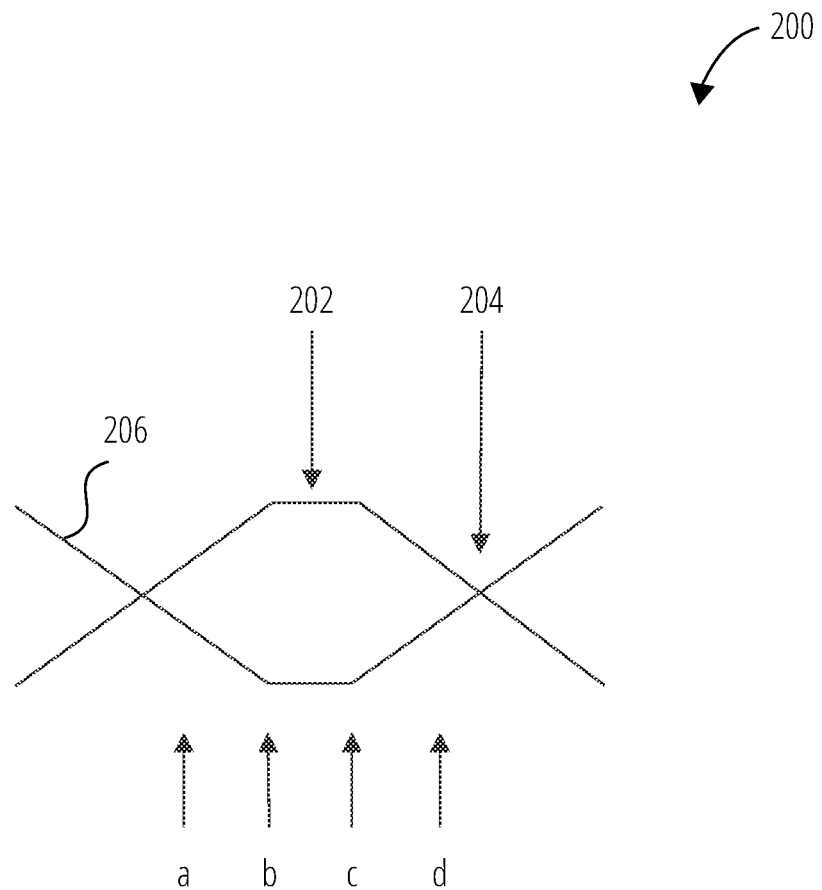
FIG. 2 is an eye diagram, according to some embodiments.

FIG. 2 is an eye diagram 200, according to some embodiments. The eye diagram 200 includes a signal 206 that rises and falls between different voltage levels corresponding to different logic levels. In the example illustrated in FIG. 2, the signal 206 is configured to transition between two voltages including a logic level high and a logic level low.

When PHY 102 (FIG. 1) receives signal 206, PHY 102 samples the signal 206 to determine whether the signal 206 is at the logic level high or at the logic level low for each symbol conveyed by the signal 206. In sampling the signal 206, the best sampling phase would be at the center 202 of each symbol. The center 202 may be determined if the edge 204 of the symbol is known or detected, and the time length of each symbol is known.

Embodiments disclosed herein enable detection of the edge 204 of the symbols in a received signal 206 through oversampling of the signal 206. By way of non-limiting example, four times multi-sampling may be used (four samples per symbol). As a result, four different sample phases a, b, c, d may be used to sample the signal 206. Once detected, the edge 204 may be used to estimate which of the four different sample phases a, b, c, d may be near the center 202.

It should be noted that, as illustrated in FIG. 2, in some embodiments the sample phases a, b, c, d may be substantially equally spaced in time. In some embodiments, however, the sample phases a, b, c, d, may be spaced at unequal intervals of time without departing from embodiments disclosed herein.

Figure 3:
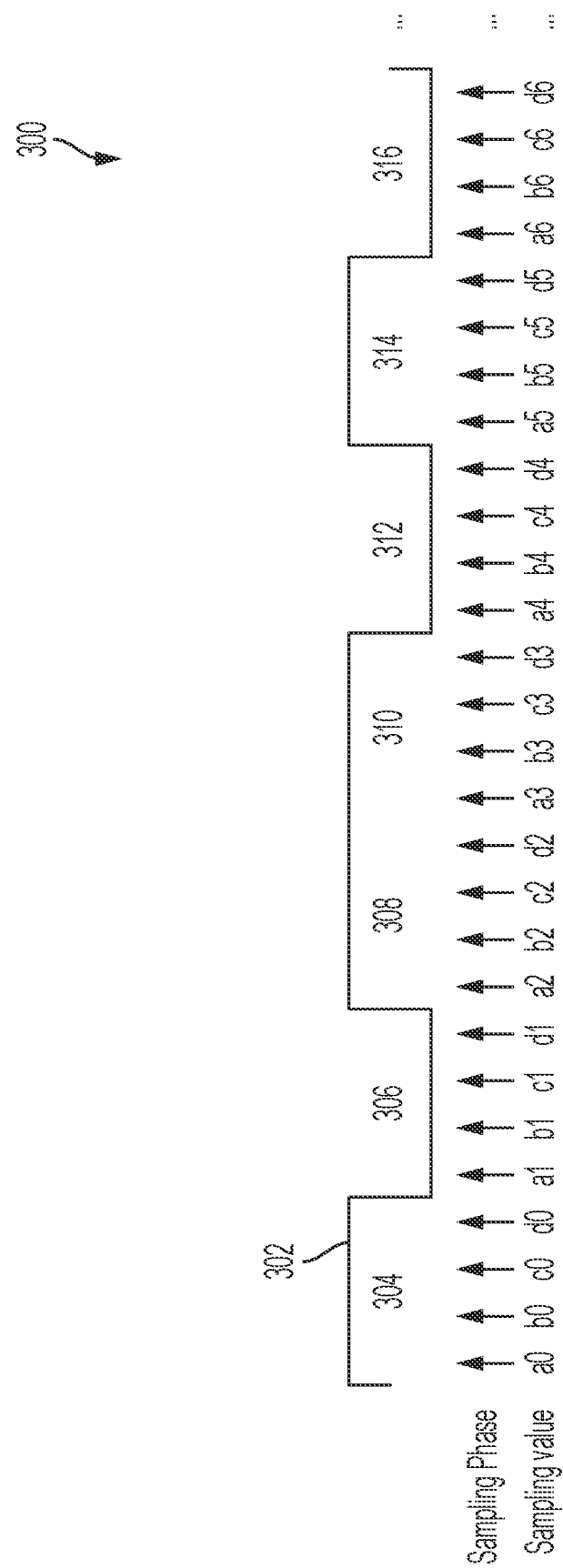
FIG. 3 is a symbol sampling diagram, according to some embodiments.

FIG. 3 is a symbol sampling diagram 300, according to some embodiments. The symbol sampling diagram 300 includes a signal 302. The signal 302 includes symbols 304, 306, 308, 310, 312, 314, 316. As previously discussed, the signal 302 may be multi-sampled (e.g., more than one sample per symbol). In the example of FIG. 3 the signal 302 is four times multi-sampled (four samples per symbol) with sample phases a, b, c, d. Sample phase a has one sample value from each of the symbols 304-316. As a result, a=[a0 a1 a2 a3 a4 a5 a6 . . . ]. Similarly, sample phases b, c, and d each have one sample value from each of the symbols 304-316. As a result, b=[b0 b1 b2 b3 b4 b5 b6 . . . ], c=[c0 c1 c2 c3 c4 c5 c6 . . . ], and d=[d0 d1 d2 d3 d4 d5 d6 . . . ].

Proposed herein are two different solutions to finding which of the sample phases a, b, c, and d is an edge sample phase so that a center sample phase may be determined.

Figure 4:
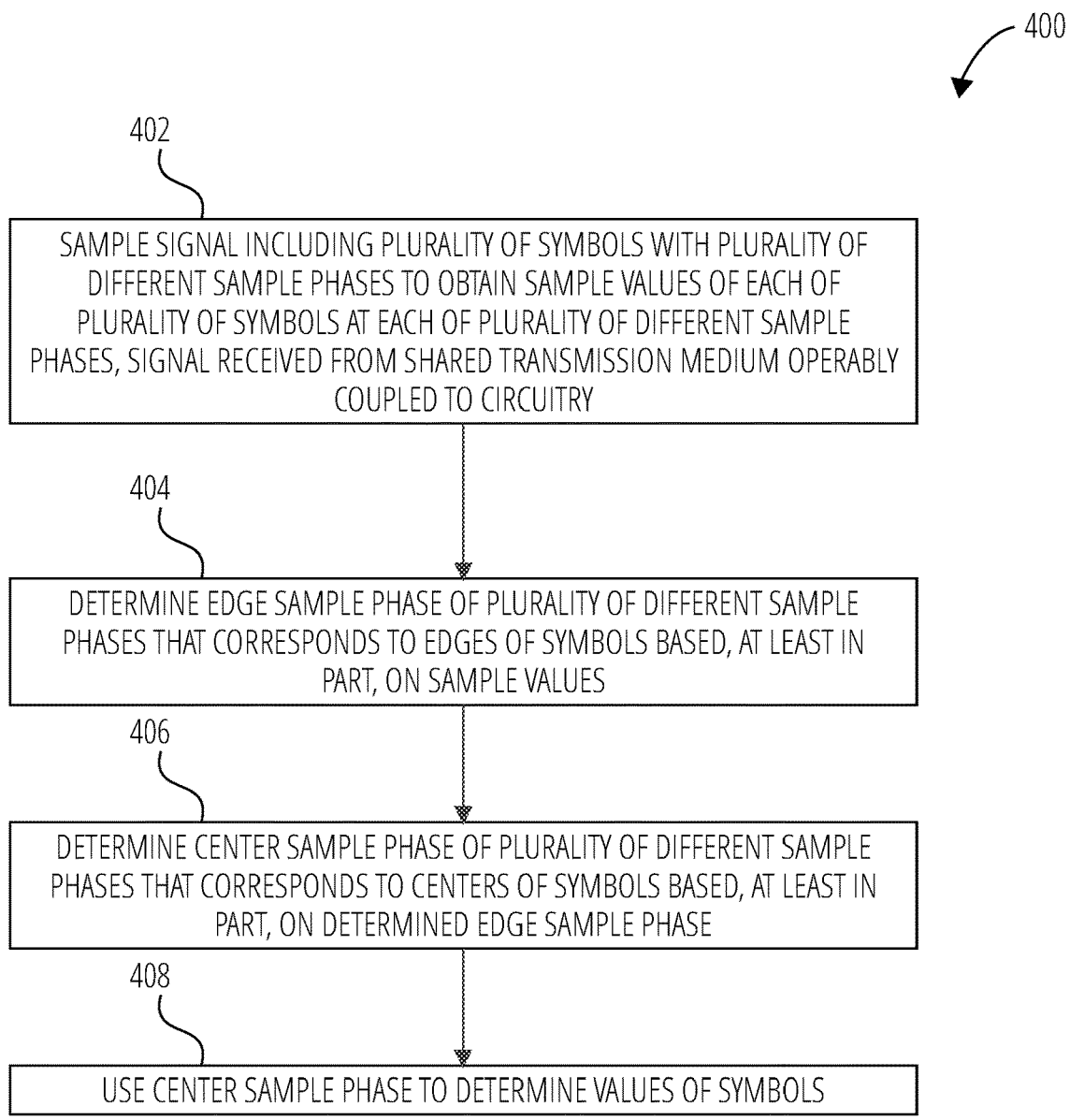
FIG. 4 is a flowchart illustrating a method of selecting a sample phase of a signal from a plurality of different sample phases, according to some embodiments.

FIG. 4 is a flowchart illustrating a method 400 of selecting a sample phase (e.g., a center sample phase) of a signal (e.g., signal 302 of FIG. 3) from a plurality of different sample phases (e.g., a, b, c, and d of FIG. 3), according to some embodiments. Referring to FIG. 3 and FIG. 4 together, in operation 402, method 400 samples, with circuitry (e.g., PHY 102 of FIG. 1) of a physical layer of a wired local area network (e.g., network segment 100 of FIG. 1), a signal 302 including a plurality of symbols 304-316 with a plurality of different sample phases a, b, c, d to obtain sample values a0-d6 of each of the plurality of symbols 304-316 at each of the plurality of different sample phases a, b, c, d. The signal 302 is received from a shared transmission medium 106 operably coupled to the PHY 102 (FIG. 1).

In operation 404, method 400 determines an edge sample phase of the plurality of different sample phases a, b, c, d that corresponds to edges of the symbols 304 316 based on the sample values a0-d6. The discussions below for FIG. 5 and FIG. 6 together illustrate a first method 600 of determining an edge sample phase. Discussions below for FIG. 7, FIG. 8, and FIG. 9 together illustrate two subsets of a second method 800, 900 of determining an edge sample phase.

In operation 406, method 400 determines a center sample phase of the plurality of different sample phases that corresponds to centers of the symbols based on the determined edge sample phase. In some embodiments, determining a center sample phase of the plurality of different sample phases a, b, c, d that corresponds to centers of the symbols 304-316 based on the edge sample phase comprises determining the center sample phase to be a sample phase that is approximately one half of a symbol length of time from the edge sample phase. By way of non-limiting example, if an edge sample phase is determined to be a, either b or c may be determined to be the center sample phase. Also by way of non-limiting example, if the edge sample phase is determined to be sample phase d, either b or c may be determined to be the center sample phase.

In operation 408, method 400 uses the determined center sample phase of operation 406 to determine values of the symbols. By way of non-limiting example, if b is determined to be the center sample phase, the values of the symbols 304-316 may be determined to be b=[b0 b1 b2 b3 b4 b5 b6 . . . ]. Also by way of non-limiting example, if c is determined to be the center sample phase, the values of the symbols 304-316 may be determined to be c=[c0 c1 c2 c3 c4 c5 c6 . . . ].

Figure 5:
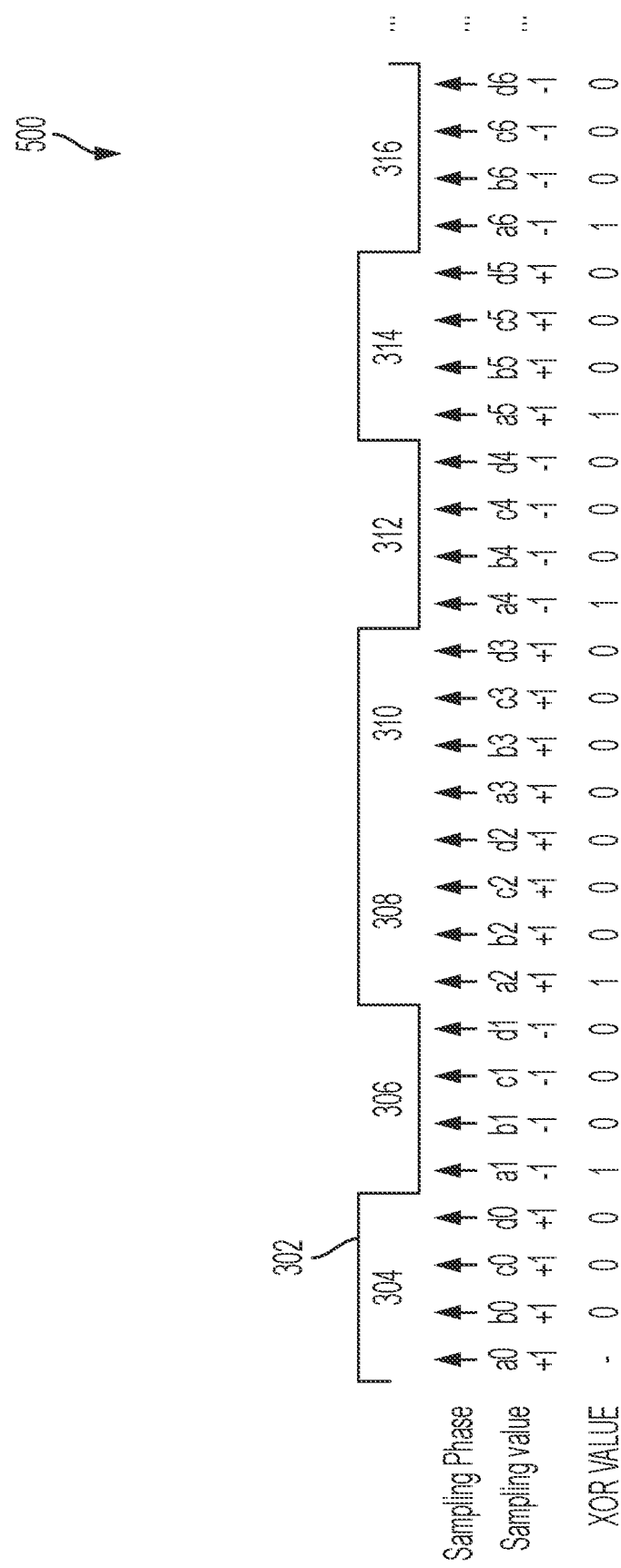
FIG. 5 is another symbol sampling diagram, according to some embodiments.

FIG. 5 is another symbol sampling diagram 500, according to some embodiments. The symbol sampling diagram 500 includes the signal 302, the symbols 304 316, the sampling phases a, b, c, d, and the sampling values a0-d6 of FIG. 3. In addition, FIG. 5 indicates values for the sampling values a0-d6. For example, a=[1 −1 1 1 −1 1 −1 . . . ], b=[1 −1 1 1 −1 1 −1 . . . ], c=[1 −1 1 1 −1 1 −1 . . . ], and d=[1 −1 1 1 −1 1 −1 . . . ]. It is noted that a sampled logic level high is represented by a "1," and a sampled logic level low is represented by a "−1." It should be noted that for purposes of FIGS. 5 and 6, a predetermined value may be used to represent a logic level high, and a negative of the predetermined value may be used to represent a logic level low.

An edge sample phase may be determined by counting an edge at each sampling phase a, b, c, d. This may be accomplished using the method 600 of FIG. 6.

Figure 6:
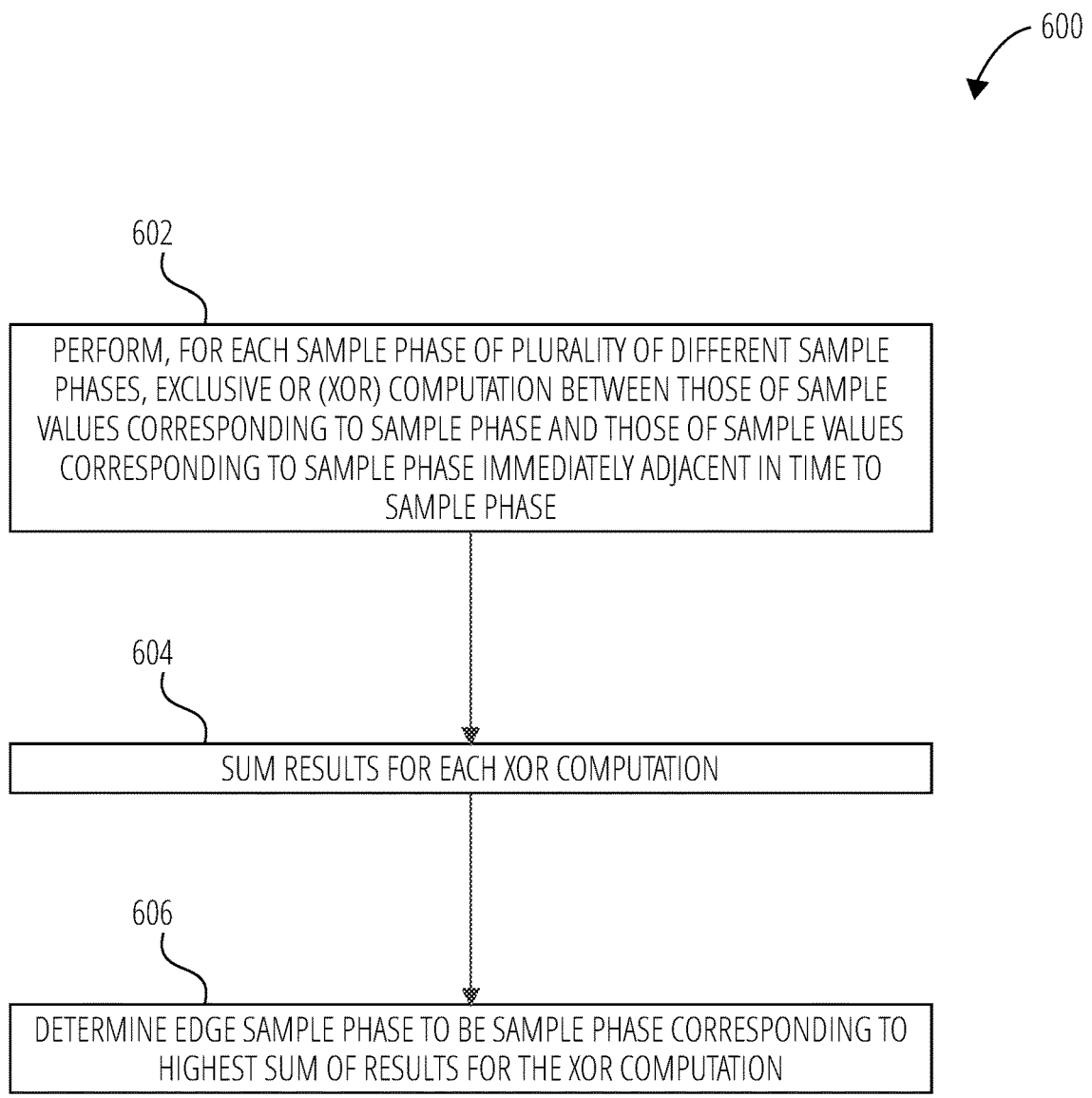
FIG. 6 is a flowchart illustrating a method of determining an edge sample phase, according to some embodiments.

FIG. 6 is a flowchart illustrating a method 600 of determining an edge sample phase, according to some embodiments. Referring to FIGS. 5 and 6 together, in operation 602, method 600 performs, for each sample phase of the plurality of different sample phases a, b, c, d, an exclusive or (XOR) computation between those of the sample values corresponding to the sample phase and those of the sample values corresponding to a sample phase immediately adjacent in time to the sample phase. For example, an edge of each sampling phase may be determined corresponding to a sample phase immediately preceding the sample phase. More specifically, the following may be computed:

$$e(a,n)=a(n) \text{ XOR } d(n-1)$$

$$e(b,n)=b(n) \text{ XOR } a(n)$$

$$e(c,n)=c(n) \text{ XOR } b(n)$$

$$e(d,n)=d(n) \text{ XOR } c(n)$$

where e(x,n) denotes an edge computation of sample phase x, for bit n.

The result of computing e(a,n)=a(n) XOR d(n−1) is obtained by computing [1 −1 1 1 −1 1 −1 . . . ] XOR [*1 −1 1 1 −1 1 . . . ], which results in e(a,n)=[*1 1 0 1 1 1 . . . ], where "*" denotes an unknown value. The result of computing e(b,n)=b(n) XOR a(n) is obtained by computing [1 −1 1 1 −1 1 −1 . . . ] XOR [1 −1 1 1 −1 1 −1 . . . ], which results in e(b,n)=[0 0 0 0 0 0 0 . . . ]. The result of computing e(c,n)=c(n) XOR b(n) is obtained by computing [1 −1 1 1 −1 1 −1 . . . ] XOR [1 −1 1 1 −1 1 −1 . . . ], which results in e(c,n)=[0 0 0 0 0 0 0 . . . ]. The result of computing e(d,n)=d(n) XOR c(n) is obtained by computing [1 −1 1 1 −1 1 −1 . . . ] XOR [1 −1 1 1 −1 1 −1 . . . ], which results in e(d,n)=[0 0 0 0 0 0 0 . . . ].

In operation 604, method 600 sums results for each XOR computation to obtain a total edge number for each sampling phase. The total edge number for each sample phase a, b, c, d is given by taking a sum of each of the elements in e(x) (e.g., e(a,n), e(b,n), e(c,n), e(d,n)), which is given by sum (e(x)=e(x,1)+e(x,2)+e(x,3)+ . . . . For example, the total edge number for sample phase a is given by taking the sum of the elements in e(a,n)=[−1 1 0 1 1 1], which is given by 1+1+0+1+1+1=5. The total edge numbers for sample phases b, c, d are given by taking a sum of each of the elements in e(b,n), e(c,n), and e(d,n), each of which are [0 0 0 0 0 0 0], resulting in the total edge numbers for each of b, c, and d being equal to zero (sum of [0 0 0 0 0 0 0] is 0).

In operation 606, method 600 determines the edge sample phase to be the sample phase corresponding to a highest sum of the results for each XOR computation. Since the highest sum of the results of the XOR computations corresponds to sample phase a in this case (sum of e(a,n)=5 as compared to sum of e(b,n)=0, sum of e(c,n)=0, and sum of e(d,n)=0), sample phase a is determined to be the edge sample phase.

It should be noted that in the example discussed above with reference to FIG. 5, the sample values of each sample phase a, b, c, d was XORed with the sample values of the sample phase immediately preceding the sample phase in time (i.e., a(n) was XORed with d(n-1), b(n) was XORed with a(n), c(n) was XORed with b(n), and d(n) was XORed with c(n). In other words, in some embodiments operation 602 includes performing an XOR computation between those of the sample values corresponding to the sample phase and those of the sample values corresponding to a sample phase immediately preceding the sample phase in time.

In some embodiments, however, the sample values of each sample phase a, b, c, d may be XORed with the sample values of the sample phase immediately following the sample phase in time (i.e., a(n) may be XORed with b(n), b(n) may be XORed with c(n), c(n) may be XORed with d(n), and d(n) may be XORed with a(n+1)). In such embodiments, e(a,n)=[1 −1 1 1 −1 1 −1 . . . ] XOR[1 −1 1 1 −1 1 −1 . . . ]=[0 0 0 0 0 0 0 . . . ], e(b,n)=[1 −1 1 1 −1 1 −1 . . . ] XOR[1 −1 1 1 −1 1 −1 . . . ]=[0 0 0 0 0 0 0 . . . ], e(c,n)=[1 −1 1 1 −1 1 −1 . . . ] XOR[1 −1 1 1 −1 1 −1 . . . ]=[0 0 0 0 0 0 0 . . . ], and e(d,n)=[1 −1 1 1 −1 1 −1 . . . ] XOR [−1 1 1 −1 1 −1 * . . . ]=[1 1 0 1 1 * . . . ]. As a result, the sums e(x) for each of the sample phases a, b, c, d are 0, 0, 0, and 5, respectively. In this case, d is selected to be the edge sample phase. In other words, in some embodiments operation 602 includes performing an XOR computation between those of the sample values corresponding to the sample phase and those of the sample values corresponding to a sample phase immediately following the sample phase in time. It should be noted that although +/−1 are used to show logic levels high/low, respectively, any values other than +/−1 may be used (e.g., +/−2, +/−3) instead of +/−1 without departing from embodiments disclosed herein. It should also be noted that, since e(x,n) is determined using an XOR computation that "1" and "0" may be used to represent the signal 302 instead +/−1 without departing from embodiments of the disclosure.

Figure 7:
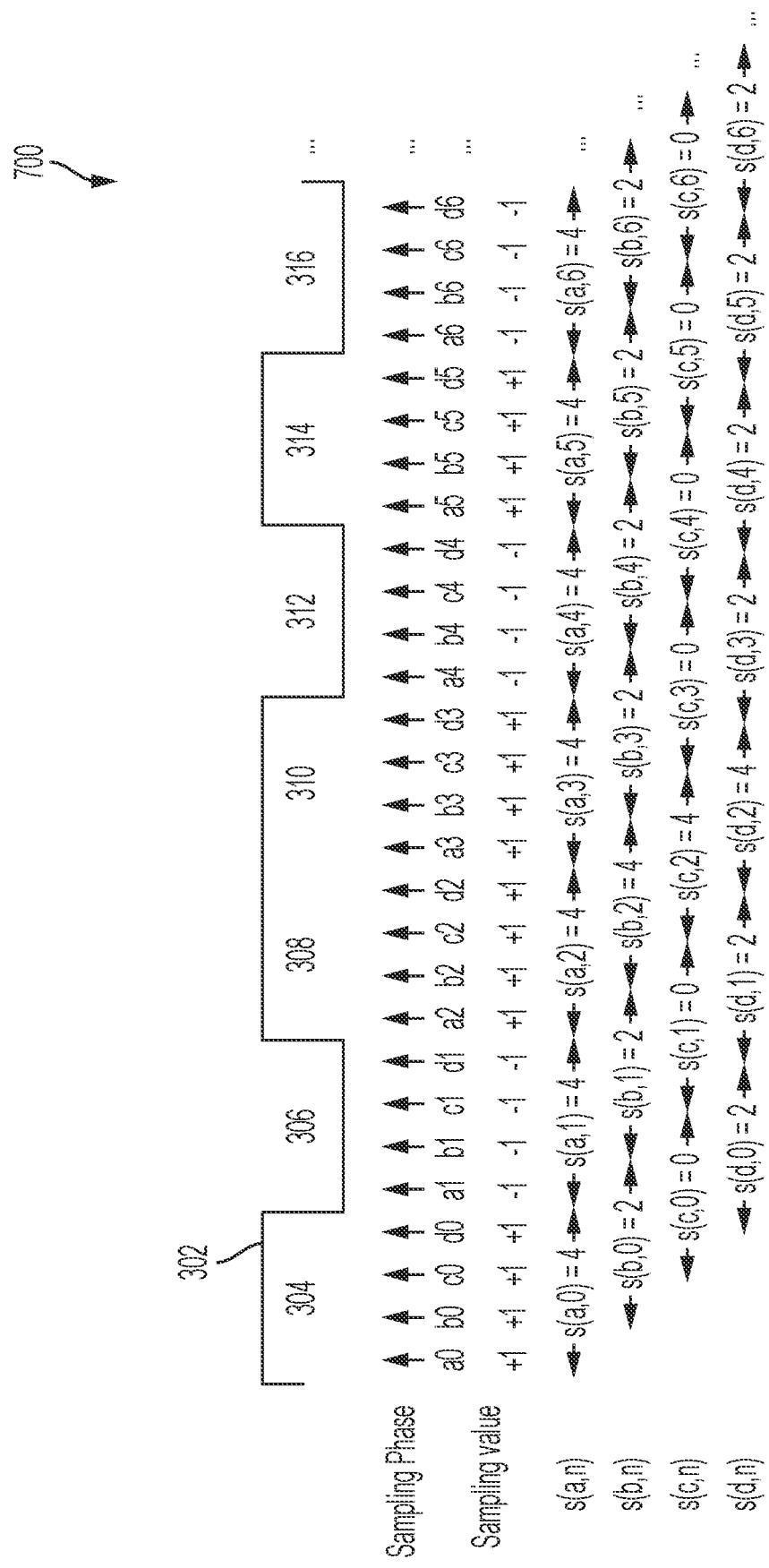
FIG. 7 is yet another symbol sampling diagram, according to some embodiments.

FIG. 7 is yet another symbol sampling diagram 700, according to some embodiments. The symbol sampling diagram 700 includes the signal 302 of FIG. 3. The signal 302 includes the symbols 304-316, the sampling phases a, b, c, d, and the sampling values a0-d6 of FIG. 3. In addition, FIG. 7 indicates values for the sampling values a0-d6 similar to FIG. 5. For example, a=[1 −1 1 1 −1 1 −1 . . . ], b =[1 −1 1 1 −1 1 −1 . . . ], c =[1 −1 1 1 −1 1 −1 . . . ], and d=[1 −1 1 1 −1 1 −1 . . . ].

An edge sample phase may be determined by computing an absolute sum of a symbol time at each sample phase a, b, c, d. This may be accomplished using the method 800 of FIG. 8 or the method 900 of FIG. 9.

Figure 8:
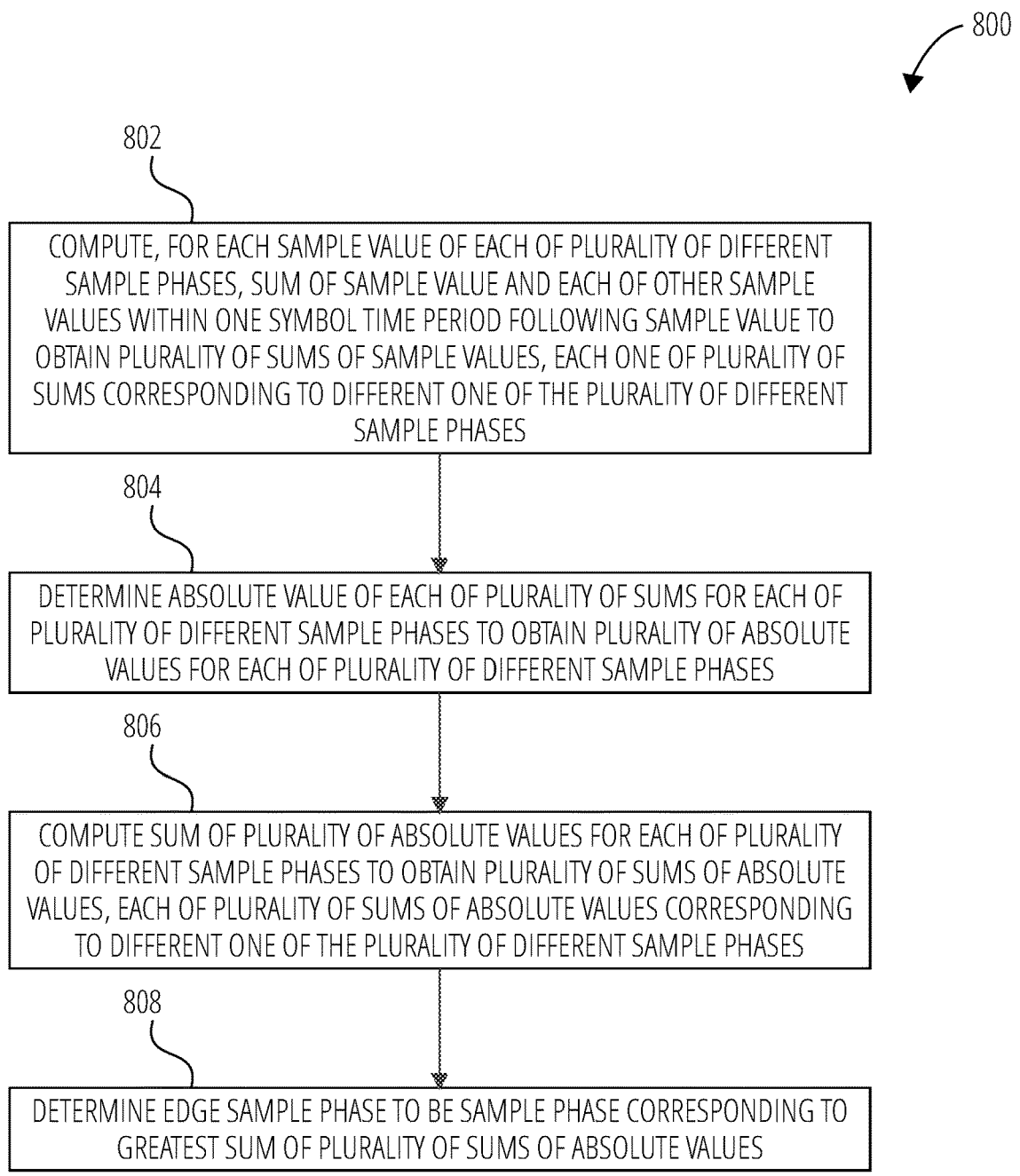
FIG. 8 is a flowchart illustrating another method of determining an edge sample phase, according to some embodiments.

FIG. 8 is a flowchart illustrating another method 800 of determining an edge sample phase, according to some embodiments. Referring to FIGS. 7 and 8 together, in operation 802, method 800 computes, for each sample value of each of the plurality of different sample phases, a sum of the sample value and each of the other sample values within one symbol time period following the sample value to obtain a plurality of sums of the sample values. Each one of the plurality of sums corresponds to a different one of the plurality of different sample phases. For example, the plurality of sums may be expressed as follows:

$$\text{sum}(a,n)=a(n)+b(n)+c(n)+d(n)$$

$$\text{sum}(b,n)=b(n)+c(n)+d(n)+a(n+1)$$

$$\text{sum}(c,n)=c(n)+d(n)+a(n+1)+b(n+1)$$

$$\text{sum}(d,n)=d(n)+a(n+1)+b(n+1)+c(n+1)$$

In operation 804, method 800 determines an absolute value of each of the plurality of sums for each of the plurality of different sample phases to obtain a plurality of absolute values for each of the plurality of different sample phases. As a result, the plurality of absolute values may be expressed as follows:

$$s(a,n)=\text{abs}(\text{sum}(a,n))$$

$$s(b,n)=\text{abs}(\text{sum}(b,n))$$

$$s(c,n)=\text{abs}(\text{sum}(c,n))$$

$$s(d,n)=\text{abs}(\text{sum}(d,n))$$

Performing these absolute value computations for each sample frequency and each symbol results in the following plurality of absolute values, as shown in the lower four rows of FIG. 7:

$$s(a,0)=4, s(a,1)=4, s(a,2)=4, s(a,3)=4, s(a,4)=4, s(a,5)=4, s(a,6)=4$$

$$s(b,0)=2, s(b,1)=2, s(b,2)=4, s(b,3)=2, s(a,4)=2, s(b,5)=2, s(b,6)=2$$

$$s(c,0)=0, s(c,1)=0, s(c,2)=4, s(c,3)=0, s(a,4)=0, s(c,5)=0, s(c,6)=0$$

$$s(d,0)=2, s(d,1)=2, s(d,2)=4, s(d,3)=2, s(a,4)=2, s(d,5)=2, s(d,6)=2$$

In operation 806, method 800 computes a sum of the plurality of absolute values for each of the plurality of different sample phases to obtain a plurality of sums of absolute values, each of the plurality of sums of absolute values corresponding to a different one of the plurality of different sample phases. Each of the plurality of sums of absolute values may be given as sum(x)=s(x,1)+s(x,2)+s(x, 3)+ . . . , where x is a, b, c, or d. The plurality of sums of absolute values for each sample phase a, b, c, d is shown below:

sum of absolute values of sample phase a: 4+4+4+4+4+4+4=28 sum of absolute values of sample phase b: 2+2+4+2+2+2+2=16 sum of absolute values of sample phase c: 0+0+4+0+0+0+0=4 sum of absolute values of sample phase d: 2+2+4+2+2+2+2=16

In operation 808, method 800 determines the edge sample phase to be a sample phase corresponding to a greatest sum of the plurality of sums of absolute values. In other words, the sampling phase with the largest sum of absolute values is the most likely to be the edge sample phase. In the example discussed above the largest sum of absolute values is 28, corresponding to sample phase a. Accordingly, in this example, sample phase a is selected to be the edge sample phase.

Figure 9:
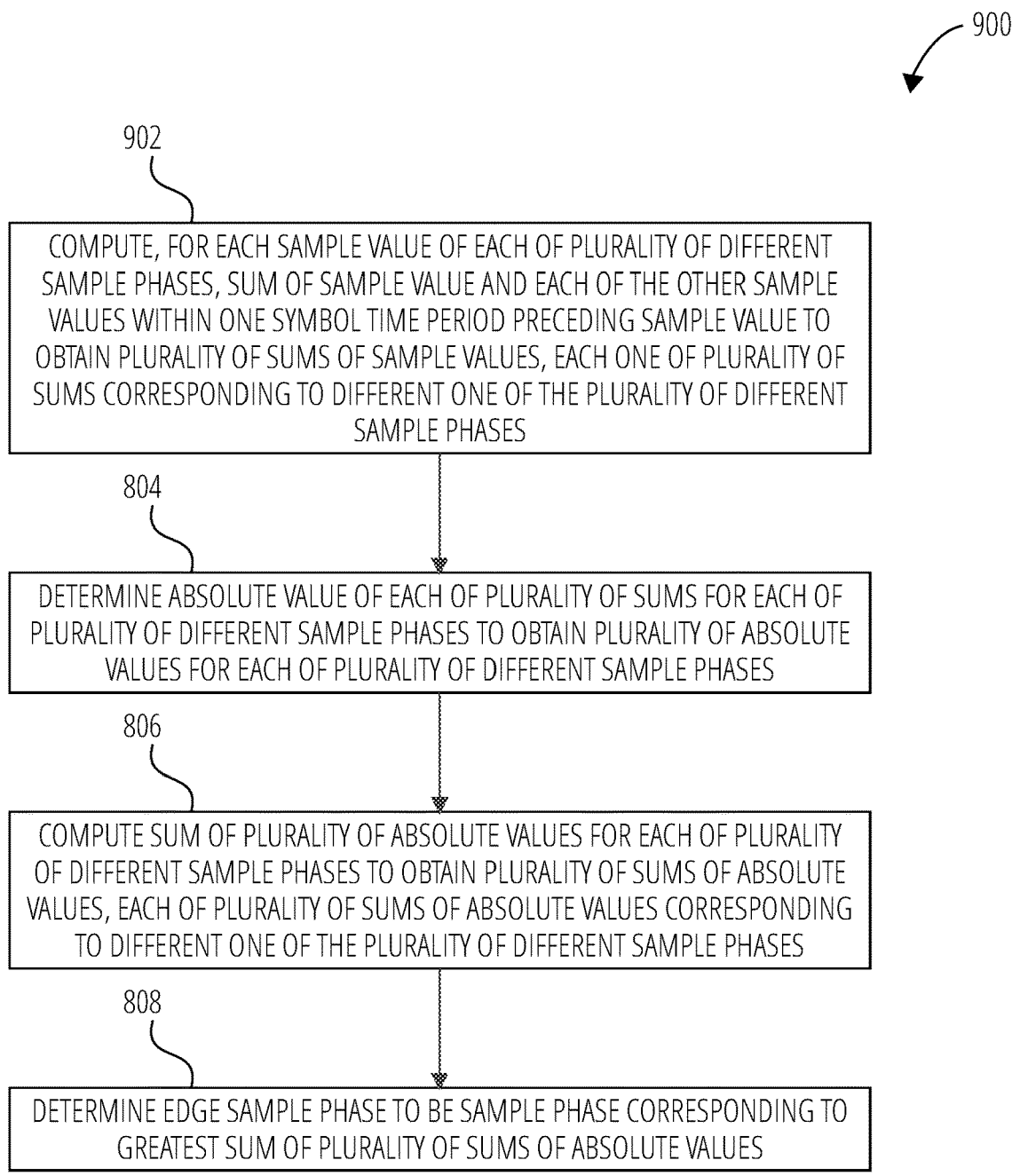
FIG. 9 is a flowchart illustrating yet another method of determining an edge sample phase, according to some embodiments.

It should be noted that the method 800 of FIG. 8 uses, in operation 802, a sum of a sample value and each of the other sample values within one symbol time period following the sample value to obtain the plurality of sums of sample values. As a result, the edge sample phase determined in operation 808 is the first sample phase following a symbol edge. It should also be noted that in some embodiments, rather than using a sum of the sample value and each of the other sample values within one symbol time period following the sample value, a sum of the sample value and each of the other sample values within one symbol time period preceding the sample value may be used to obtain the plurality of sums of sample values. FIG. 9 below is directed to such embodiments.

FIG. 9 is a flowchart illustrating yet another method 900 of determining an edge sample phase, according to some embodiments. The method 900 of FIG. 9 is similar to the method 800 of FIG. 8 except that operation 902 is substituted for operation 802. In operation 902, method 900 computes, for each sample value of each of the plurality of different sample phases, a sum of the sample value and each of the other sample values within one symbol time period preceding the sample value to obtain a plurality of sums of the sample values. Similar to operation 802 of FIG. 8, each one of the plurality of sums corresponding to a different one of the plurality of different sample phases. In contrast to the method 800 of FIG. 8, however, since operation 902 uses the sum of the sample value and each of the other sample values within one symbol time period preceding the sample value, in operation 808 of FIG. 9 the determined edge sample phase will be the last sample phase occurring within each symbol. In the example illustrated in FIG. 7 the edge sample phase would be determined to be sample phase d.

Figure 10:
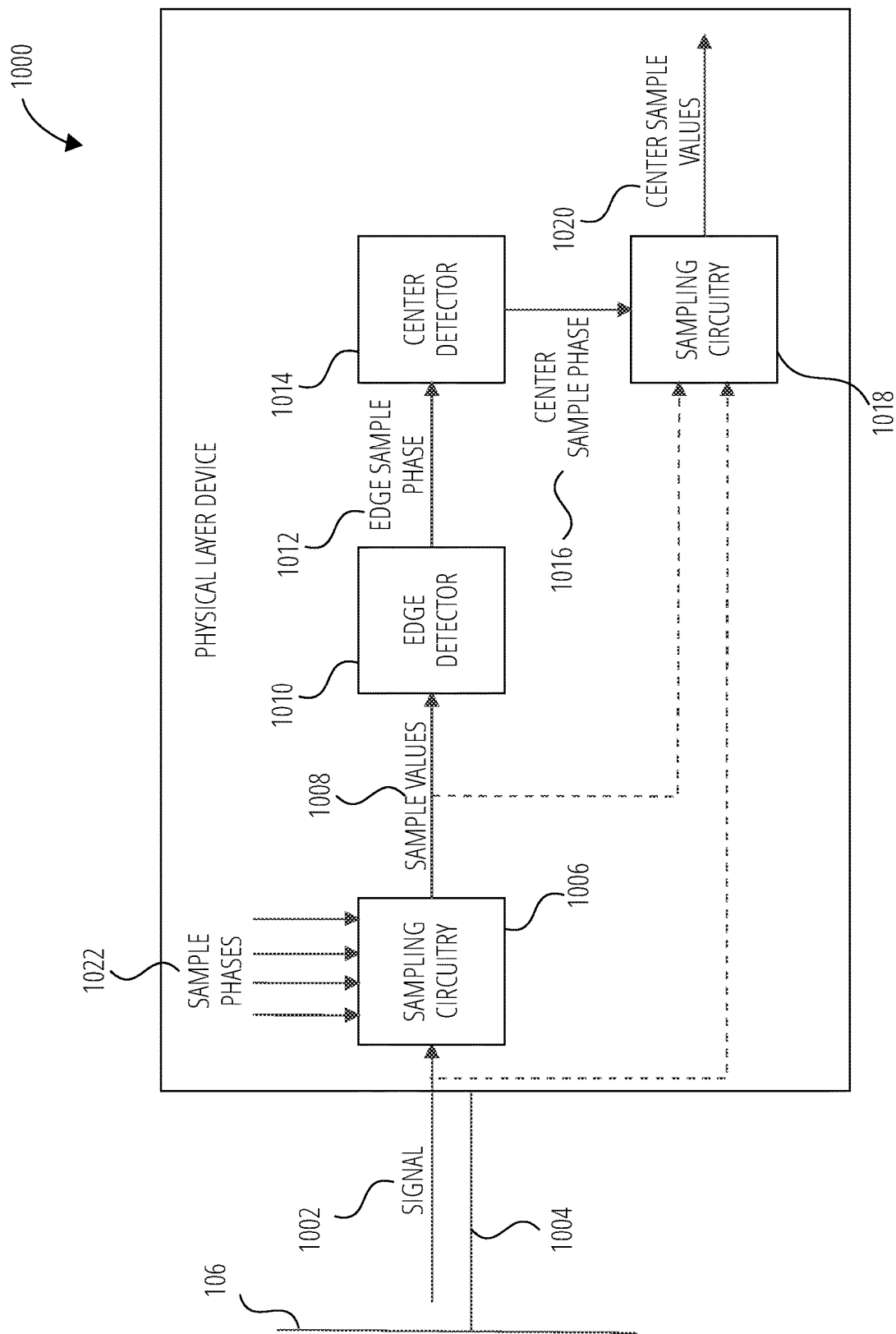
FIG. 10 is a block diagram of a physical layer device, according to some embodiments.

FIG. 10 is a block diagram of a physical layer device 1000, according to some embodiments. In some embodiments the PHY 102 (FIG. 1) may embody the physical layer device 1000. The physical layer device 1000 includes an input 1004 (e.g., a pin of a semiconductor device package including the physical layer device 1000) configured to receive a signal 1002 from shared transmission medium 106 (FIG. 1). The physical layer device 1000 is configured to detect a center sample phase 1016 of signal 1002 and sample signal 1002 using center sample phase 1016.

The physical layer device 1000 includes sampling circuitry 1006 configured to receive signal 1002, which may delivered to input 1004 of the physical layer device 1000 from shared transmission medium 106. The sampling circuitry 1006 is configured to measure sample values 1008 of signal 1002 at a plurality of different sample phases 1022 and provide the sample values 1008 to an edge detector 1010.

The edge detector 1010 is configured to receive the sample values 1008 from sampling circuitry 1006 and determine an edge sample phase 1012 from the plurality of different sample phases 1022 based, at least in part, on the sample values 1008. For example, the edge detector 1010 may be configured to determine the edge sample phase 1012 using the method 600 of FIG. 6, the method 800 of FIG. 8, or the method 900 of FIG. 9. Edge detector 1010 is configured to provide edge sample phase 1012 to a center detector 1014.

Center detector 1014 is configured to receive the edge sample phase 1012 from edge detector 1010 and determine a center sample phase 1016 based, at least in part, on the edge sample phase 1012. Sampling circuitry 1018 is configured to provide center sample values 1020 of signal 1002. In some embodiments sampling circuitry 1018 is configured to use the sample values 1008 provided by sampling circuitry 1006, which enables sampling circuitry 1018 to identify the center sample values 1020 by merely selecting those of the sample values 1008 corresponding to center sample phase 1016 without resampling signal 1002. In some embodiments sampling circuitry 1018 is configured to resample signal 1002 at the center sample phase 1016 indicated by center detector 1014.

In some embodiments the physical layer device 1000 includes one or more processors configured to perform the operations of the physical layer device 1000. In some embodiments, some or all of the physical layer device 1000 may be implemented using software or firmware stored by one or more data storage devices and executed by processing circuitry (see the computing device 1100 of FIG. 11). In some embodiments, some or all of the physical layer device 1000 may be implemented using electrical hardware components such as combinational logic. By way of non-limiting example, some or all of the physical layer device 1000 may be implemented using a Field Programmable Gate Array (FPGA), a Programmable Logic Controller (PLC), other logic device, or combinations thereof.

Figure 11:
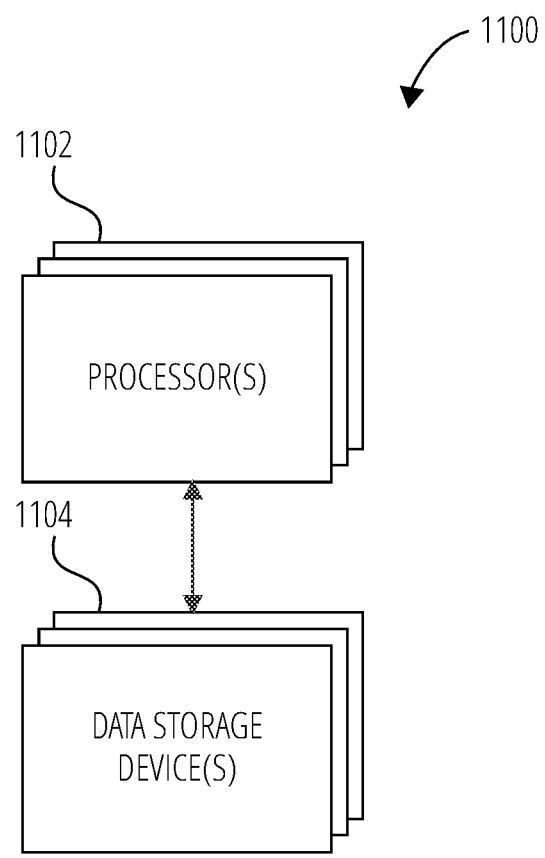
FIG. 11 is a block diagram of a computing device that may be used in some embodiments.

FIG. 11 is a block diagram of a computing device 1100 that may be used in some embodiments. The computing device 1100 includes one or more processors 1102 (sometimes referred to herein as "processors" 1102) operably coupled to one or more data storage devices 1104 (sometimes referred to herein as "storage" 1104). The storage 1104 includes computer-readable instructions stored thereon. The computer-readable instructions are configured to instruct the processors 1102 to perform operations of embodiments disclosed herein. For example, the computer-readable instructions may be configured to instruct the processors 1102 to perform at least a portion or a totality of the method 400 of FIG. 4, the method 600 of FIG. 6, the method 800 of FIG. 8, and/or the method 900 of FIG. 9. As another example, the computer-readable instructions may be configured to instruct the processors 1102 to perform at least a portion or a totality of the operations discussed for the portion PHY 102 of FIG. 1. As a further example, the computer-readable instructions may be configured to instruct the processors 1102 to perform at least a portion or a totality of the operations discussed for the physical layer device 1000 of FIG. 10. As a specific, non-limiting example, the computer-readable instructions may be configured to instruct the processors 1102 to sample a signal received from a shared transmission medium using a plurality of different sample phases, determine an edge sample phase of the plurality of different sample phases, and determine a center sample phase of the plurality of different sample phases based on the edge sample phase.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

EXAMPLES

A non-exhaustive, non-limiting list of example embodiments follows. Not each of the example embodiments listed below are individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A physical layer device, comprising: an input configured to receive a signal including a plurality of symbols from a shared transmission medium of a wired local area network; and one or more processors configured to: sample the signal using a plurality of different sample phases to obtain sample values of each of the plurality of symbols at each of the plurality of different sample phases; determine an edge sample phase of the plurality of different sample phases responsive to the obtained sample values of each of the plurality of symbols at each of the plurality of different sample phases; determine a center sample phase of the plurality of different sample phases responsive to the determined edge sample phase; and use the determined center sample phase to determine values of each of the plurality of symbols.

Example 2: The physical layer device of Example 1, wherein the one or more processors are configured to determine the edge sample phase by: performing, for each sample phase of the plurality of different sample phases, an exclusive or (XOR) computation between those of the sample values corresponding to a sample phase and those of the sample values corresponding to a sample phase immediately adjacent in time to the sample phase; summing results for each XOR computation; and determining the edge sample phase to correspond to a highest sum of results for the XOR computation.

Example 3: The physical layer device of Example 2, wherein the sample phase immediately adjacent in time to the sample phase comprises a preceding sample phase immediately preceding the sample phase in time.

Example 4: The physical layer device of Example 1, wherein the one or more processors determine the edge sample phase by being configured to: compute, for each sample value of each of the plurality of different sample phases, a sum of a sample value and each of other sample values within one symbol time period following the sample value to obtain a plurality of sums of sample values, each one of the plurality of sums corresponding to a different one of the plurality of different sample phases; determine an absolute value of each sum of the plurality sums for each of the plurality of different sample phases to obtain a plurality of absolute values for each of the plurality of different sample phases; compute a sum of the plurality of absolute values for each of the plurality of different sample phases to obtain a plurality of sums of absolute values, each of the plurality of sums of absolute values corresponding to a different one of the plurality of different sample phases; and determine an edge sample phase to be a sample phase corresponding to a greatest sum of the plurality of sums of absolute values.

Example 5: The physical layer device of Example 1, wherein the one or more processors determine the edge sample phase by being configured to: compute, for each sample value of each of the plurality of different sample phases, a sum of a sample value and each of other sample values within one symbol time period preceding the sample value to obtain a plurality of sums of sample values, each one of the plurality of sums corresponding to a different one of the plurality of different sample phases; determine an absolute value of each sum of the plurality sums for each of the plurality of different sample phases to obtain a plurality of absolute values for each of the plurality of different sample phases; compute a sum of the plurality of absolute values for each of the plurality of different sample phases to obtain a plurality of sums of absolute values, each of the plurality of sums of absolute values corresponding to a different one of the plurality of different sample phases; and determine the edge sample phase to be a sample phase corresponding to a greatest sum of the plurality of sums of absolute values.

Example 6: The physical layer device according to any one of Examples 1-5, wherein the plurality of different sample phases is spaced at substantially equal intervals of time.

Example 7: The physical layer device according to any one of Examples 1-6, further comprising: sampling circuitry configured to determine the sample values of the signal; an edge detector configured determine the edge sample phase based, at least in part, on the sample values; and a center detector configured to determine the center sample phase based, at least in part, on the determined edge sample phase.

Example 8: The physical layer device according to any one of Examples 1-7, further comprising a computer-readable medium operably coupled to the one or more processors, the computer-readable medium having computer-readable instructions stored thereon, the computer-readable instructions configured to instruct the one or more processors to perform at least a portion of the method of Example 1.

Example 9: A method of selecting a sample phase of a signal from a plurality of different sample phases, the method comprising: sampling a signal including a plurality of symbols with a plurality of different sample phases to obtain sample values of each of the plurality of symbols at each of the plurality of different sample phases, the signal received from a shared transmission medium of a wired local area network; determining an edge sample phase of the plurality of different sample phases responsive to the obtained sample values of each of the plurality of symbols at each of the plurality of different sample phases; determining a center sample phase of the plurality of different sample phases responsive to the determined edge sample phase; and using the determined center sample phase to determine values of the symbols.

Example 10: The method of Example 9, wherein determining a center sample phase of the plurality of different sample phases comprises determining the center sample phase to be a sample phase that is approximately one half of a symbol length of time from the determined edge sample phase.

Example 11: The method according to any one of Examples 9 and 10, wherein determining the edge sample phase of the plurality of different sample phases comprises:

performing, for each sample phase of the plurality of different sample phases, an exclusive or (XOR) computation between those of the sample values corresponding to the sample phase and those of the sample values corresponding to a sample phase immediately adjacent in time to the sample phase; summing results for each XOR computation; and determining the edge sample phase to be the sample phase corresponding to a highest sum of the results for the XOR computation.

Example 12: The method of Example 11, wherein the sample phase immediately adjacent in time to the sample phase comprises a preceding sample phase immediately preceding the sample phase in time.

Example 13: The method according to any one of Examples 9 and 10, wherein determining the edge sample phase of the plurality of different sample phases comprises: computing, for each sample value of each of the plurality of different sample phases, a sum of the sample value and each of the other sample values within one symbol time period following the sample value to obtain a plurality of sums of the sample values, each one of the plurality of sums corresponding to a different one of the plurality of different sample phases; determining an absolute value of each of the plurality of sums for each of the plurality of different sample phases to obtain a plurality of absolute values for each of the plurality of different sample phases; computing a sum of the plurality of absolute values for each of the plurality of different sample phases to obtain a plurality of sums of absolute values, each of the plurality of sums of absolute values corresponding to a different one of the plurality of different sample phases; and determining the edge sample phase to be a sample phase corresponding to a greatest sum of the plurality of sums of absolute values.

Example 14: The method according to any one of Examples 9 and 10, wherein determining the edge sample phase of the plurality of different sample phases comprises: computing, for each sample value of each of the plurality of different sample phases, a sum of each of the sample value and each of the sample values within one symbol time period preceding the sample value to obtain a plurality of sums of the sample values, each one of the plurality of sums corresponding to a different one of the plurality of different sample phases; determining an absolute value of each of the plurality of sums for each of the plurality of different sample phases to obtain a plurality of absolute values for each of the plurality of different sample phases; computing a sum of the plurality of absolute values for each of the plurality of different sample phases to obtain a plurality of sums of absolute values, each of the plurality of sums of absolute values corresponding to a different one of the plurality of different sample phases; and determining the edge sample phase to be a sample phase corresponding to a greatest sum of the plurality of sums of absolute values.

Example 15: The method of Example 14, wherein a number of the plurality of different sample phases comprises four different sample phases and the center sample phase is selected to be one of two sample phases immediately preceding the edge sample phase in time.

Example 16: A non-transitory computer-readable storage medium, the computer-readable storage medium including instructions that when executed by one or more processors, cause the one or more processors to: sample a signal including a plurality of symbols with a plurality of different sample phases to obtain sample values of each of the plurality of different sample phases, the signal received from a shared transmission medium of a wired local area network; determine an edge sample phase of the plurality of different sample phases based on the sample values; determine a center sample phase of the plurality of different sample phases based on the determined edge sample phase; and use the determined center sample phase to determine values of the symbols.

CONCLUSION

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A physical layer device, comprising:
   an input terminal configured to receive a signal including a plurality of symbols from a shared transmission medium of a wired local area network; and
   one or more processors configured to:
      sample the signal using a plurality of different sample phases to obtain sample values of each of the plurality of symbols at each of the plurality of different sample phases;
      compute, for each of the obtained sample values of each of the plurality of different sample phases, a sum of a sample value and each of other sample values within one symbol time period following the sample value to obtain a plurality of sums of sample values, each one of the plurality of sums corresponding to a different one of the plurality of different sample phases;
      determine an absolute value of each sum of the plurality of sums for each of the plurality of different sample phases to obtain a plurality of absolute values for each of the plurality of different sample phases;
      compute a sum of the plurality of absolute values for each of the plurality of different sample phases to obtain a plurality of sums of absolute values, each of the plurality of sums of absolute values corresponding to a different one of the plurality of different sample phases; and
      determine an edge sample phase of the plurality of different sample phases to be a sample phase corresponding to a greatest sum of the plurality of sums of absolute values;
      determine a center sample phase of the plurality of different sample phases responsive to the determined edge sample phase; and
      use the determined center sample phase to determine values of each of the plurality of symbols.

2. A method of selecting a sample phase of a signal from a plurality of different sample phases, the method comprising:
   sampling a signal including a plurality of symbols with a plurality of different sample phases to obtain sample values of each of the plurality of symbols at each of the plurality of different sample phases, the signal received from a shared transmission medium of a wired local area network;
   computing, for each sample value of each of the plurality of different sample phases, a sum of the sample value and each of the other sample values within one symbol time period following the sample value to obtain a plurality of sums of the sample values, each one of the plurality of sums corresponding to a different one of the plurality of different sample phases;

determining an absolute value of each of the plurality of sums for each of the plurality of different sample phases to obtain a plurality of absolute values for each of the plurality of different sample phases;

computing a sum of the plurality of absolute values for each of the plurality of different sample phases to obtain a plurality of sums of absolute values, each of the plurality of sums of absolute values corresponding to a different one of the plurality of different sample phases; and determining an edge sample phase to be a sample phase corresponding to a greatest sum of the plurality of sums of absolute values determining a center sample phase of the plurality of different sample phases responsive to the determined edge sample phase; and using the determined center sample phase to determine values of the symbols.

3. A method of selecting a sample phase of a signal from a plurality of different sample phases, the method comprising:

sampling a signal including a plurality of symbols with a plurality of different sample phases to obtain sample values of each of the plurality of symbols at each of the plurality of different sample phases, the signal received from a shared transmission medium of a wired local area network;

computing, for each sample value of each of the plurality of different sample phases, a sum of each of the sample value and each of the sample values within one symbol time period preceding the sample value to obtain a plurality of sums of the sample values, each one of the plurality of sums corresponding to a different one of the plurality of different sample phases;

determining an absolute value of each of the plurality of sums for each of the plurality of different sample phases to obtain a plurality of absolute values for each of the plurality of different sample phases;

computing a sum of the plurality of absolute values for each of the plurality of different sample phases to obtain a plurality of sums of absolute values, each of the plurality of sums of absolute values corresponding to a different one of the plurality of different sample phases; and determining an edge sample phase to be a sample phase corresponding to a greatest sum of the plurality of sums of absolute values;

determining a center sample phase of the plurality of different sample phases responsive to the determined edge sample phase; and using the determined center sample phase to determine values of the symbols.

4. A physical layer device, comprising:

an input terminal configured to receive a signal including a plurality of symbols from a shared transmission medium of a wired local area network; and one or more processors configured to:

sample the signal using a plurality of different sample phases to obtain sample values of each of the plurality of symbols at each of the plurality of different sample phases;

compute, for each sample value of each of the plurality of different sample phases, a sum of a sample value and each of other sample values within one symbol time period preceding the sample value to obtain a plurality of sums of sample values, each one of the plurality of sums corresponding to a different one of the plurality of different sample phases;

determine an absolute value of each sum of the plurality sums for each of the plurality of different sample phases to obtain a plurality of absolute values for each of the plurality of different sample phases;

compute a sum of the plurality of absolute values for each of the plurality of different sample phases to obtain a plurality of sums of absolute values, each of the plurality of sums of absolute values corresponding to a different one of the plurality of different sample phases;

determine an edge sample phase to be a sample phase corresponding to a greatest sum of the plurality of sums of absolute values;

determine a center sample phase of the plurality of different sample phases responsive to the determined edge sample phase; and use the determined center sample phase to determine values of each of the plurality of symbols.

* * * * *

UNITED STATES PATENT AND TRADEMARK OFFICE
CERTIFICATE OF CORRECTION

PATENT NO. : 11,374,731 B2
APPLICATION NO. : 17/445811
DATED : June 28, 2022
INVENTOR(S) : Yu et al.

Page 1 of 1

It is certified that error appears in the above-identified patent and that said Letters Patent is hereby corrected as shown below:

In the Specification

Column 4, Line 21 change "802.3Cg$^{TM}$." to --802.3cg$^{TM}$.--

Signed and Sealed this
Thirteenth Day of December, 2022

Katherine Kelly Vidal
*Director of the United States Patent and Trademark Office*